United States Patent
Aida et al.

(10) Patent No.: US 7,108,113 B2
(45) Date of Patent: Sep. 19, 2006

(54) ONE-WAY CLUTCH BUILT-IN TYPE ROTATION TRANSMISSION DEVICE

(75) Inventors: Hiroshi Aida, Fujisawa (JP); Takeo Ohkuma, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/480,382

(22) PCT Filed: Jun. 12, 2001

(86) PCT No.: PCT/JP01/04971

§ 371 (c)(1),
(2), (4) Date: Jun. 8, 2004

(87) PCT Pub. No.: WO02/101256

PCT Pub. Date: Dec. 19, 2002

(65) Prior Publication Data

US 2004/0200684 A1    Oct. 14, 2004

(51) Int. Cl.
*F16D 41/06* (2006.01)
*F16H 55/36* (2006.01)

(52) U.S. Cl. ......................................................... 192/45
(58) Field of Classification Search ..................... None
See application file for complete search history.

(56) References Cited

U.S. PATENT DOCUMENTS

| | | | |
|---|---|---|---|
| 5,469,949 A | 11/1995 | Leitz et al. | |
| 5,676,226 A | 10/1997 | Lampela et al. | 192/45.1 |
| 6,170,625 B1 * | 1/2001 | Tanaka | 192/45 |
| 6,488,135 B1 * | 12/2002 | Kinoshita | 192/45 |
| 2001/0045334 A1 * | 11/2001 | Aida et al. | 192/45 |

FOREIGN PATENT DOCUMENTS

| | | |
|---|---|---|
| EP | 0 541 013 A1 | 5/1993 |
| JP | 6-147238 A | 5/1994 |
| JP | 8-145078 A | 6/1996 |
| JP | 2000-291782 A | 10/2000 |
| JP | 2001-32911 A | 2/2001 |
| JP | 2001-41314 A | 2/2001 |
| JP | 2001-90810 A | 4/2001 |
| JP | 2001-165201 A | 6/2001 |

OTHER PUBLICATIONS

International Search Report dated Sep. 4, 2001.

* cited by examiner

*Primary Examiner*—Rodney H. Bonck
(74) *Attorney, Agent, or Firm*—Crowell & Moring LLP (57) ABSTRACT

Abrasion powder from the clutch retainer 28a is prevented from getting mixed into the grease used for lubricating the roller clutch 10, and the grease is prevented from becoming exposed to high temperatures, and so degrading too quickly is prevented in the grease. Specifically, a retaining piece 33 is formed at one end of the clutch retainer 28a in the inner-diameter side portion thereof, and a retaining collar section 34 is formed around the inner peripheral surface of the other end of the clutch retainer 28a. The inner ring 21 for the clutch is held from both sides in the axial direction between the fitting portion 35 at the tip end of the retaining piece 33 and the retaining collar section 34. Consequently, displacement in the axial direction of the clutch retainer 28a is limited, so that the axially opposite end surfaces of the clutch retainer 28a is prevented from coming in sliding contact with the sections that rotate relative to the clutch retainer 28a, specifically the inside surfaces of a pair of collar sections 27a, 27b of the outer ring 25 for the clutch.

2 Claims, 9 Drawing Sheets

ONE-WAY CLUTCH BUILT-IN TYPE ROTATION TRANSMISSION DEVICE

FIELD OF THE INVENTION

This invention relates to an improvement of a rotation transmission apparatus of the built-in one-way clutch type.

BACKGROUND OF THE INVENTION

Rotation transmissions of the built-in one-way clutch type have been used for example as a follower pulley that is fastened to the end of the rotating shaft of the alternator that is an automobile generator, or as the pinion etc. that is fastened to an end of the rotating shaft of the starter motor in the starting apparatus of an automobile, or have been used for transmitting rotation to auxiliary devices from a separate drive apparatus (motor) during idling stop while the engine is stopped.

Figure 13:
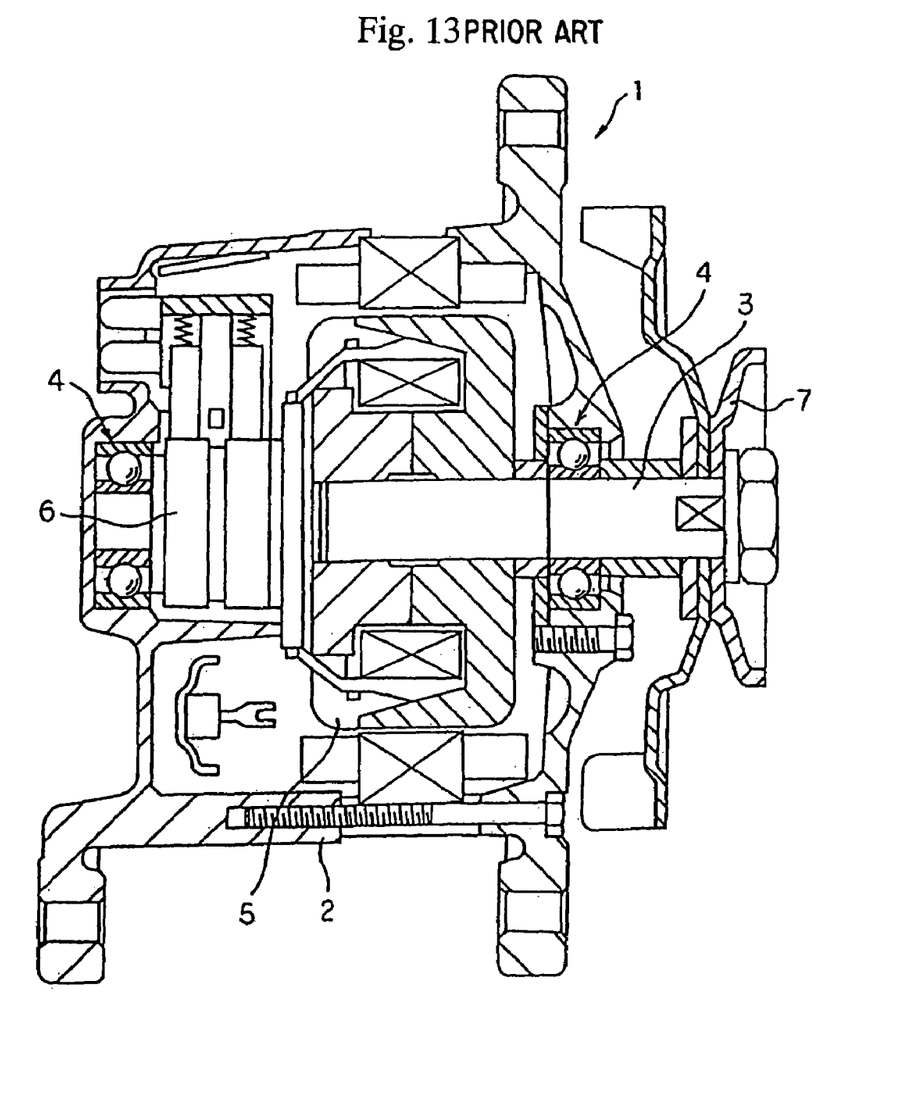
FIG. 13 is a cross sectional view to show an example of the conventional alternator.

An alternator is used for generating the necessary electrical power for an automobile, the drive source of which is the engine of the automobile. The construction of this kind of alternator has been disclosed for example in Japanese Patent Publication No. Toku Kai Hei 7-139550. FIG. 13 shows the alternator 1 that is described in this publication. The rotating shaft 3 is supported inside the housing 2 by a pair of rolling bearings 4 such that it rotates freely. In the middle section of this rotating shaft 3 there is a rotor 5 and a commutator 6. Also, a follower pulley 7 is fastened on one end of this rotating shaft 3 (right end in FIG. 13) in the section that protrudes out from the housing 2. When installed in an engine, an endless belt runs around this follower pulley 7 such that the engine can rotate and drive the rotating shaft 3 through the crankshaft.

Conventionally, a typical follower pulley 7 that was simply fastened to the rotating shaft 3 was used. However, in recent years, a rotation transmission apparatus with built-in one-way clutch has been proposed and has been used somewhat. For example, in a pulley apparatus with built-in one-way clutch, when the running speed of the endless belt is constant or when it is accelerating, power is transmitted from the endless belt to the rotating shaft, and when the running speed of the endless belt is decelerating, there is relative rotation between the follower pulley and the rotating shaft. A pulley apparatus with built-in one-way clutch having this kind of function has been disclosed for example in Japanese Patent Publications Nos. Toku Kai Sho 56-101353, Toku Kai Hei 7-317807, Toku Kai Hei 8-61443, Toku Kai Hei 8-226462, Toku Ko Hei 7-72585, and French Patent Publication No. FR2726059A1.

Figure 14:
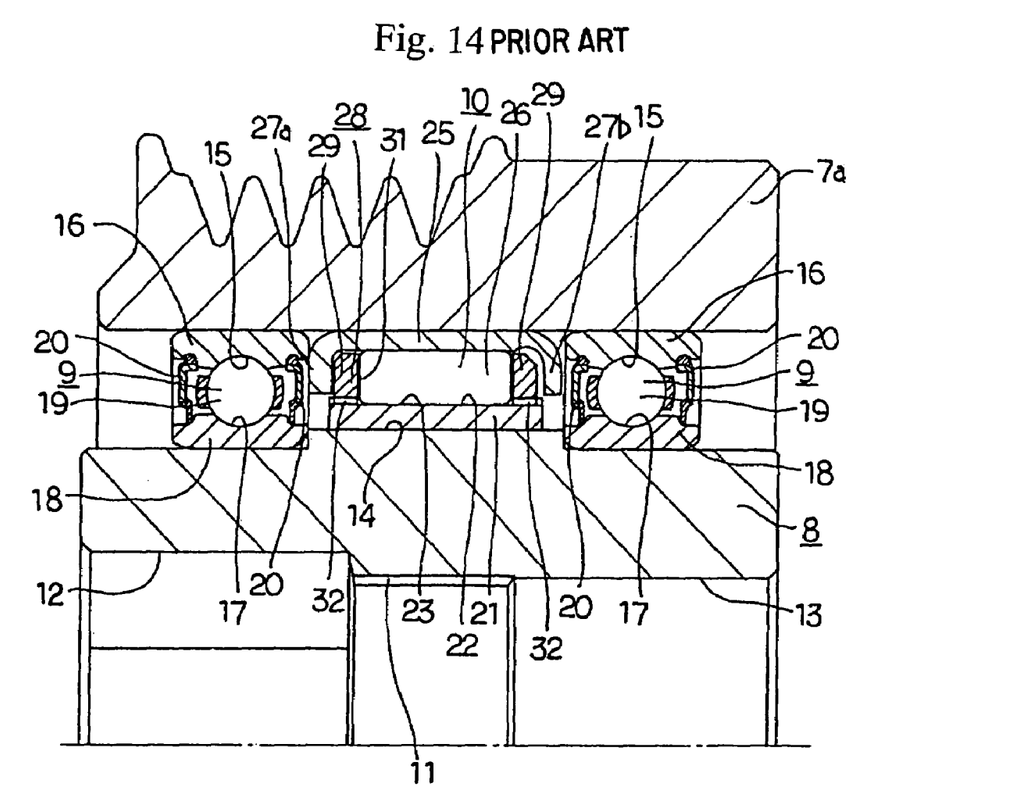
FIG. 14 is a cross sectional view to show a half of an example of the conventional structure.
Figure 15:
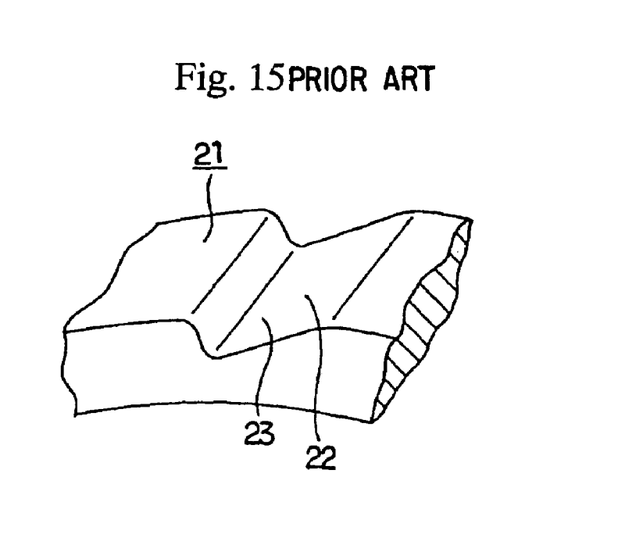
FIG. 15 is a perspective view of part of an inner ring for clutch taken from the outer diameter side.
Figure 16:
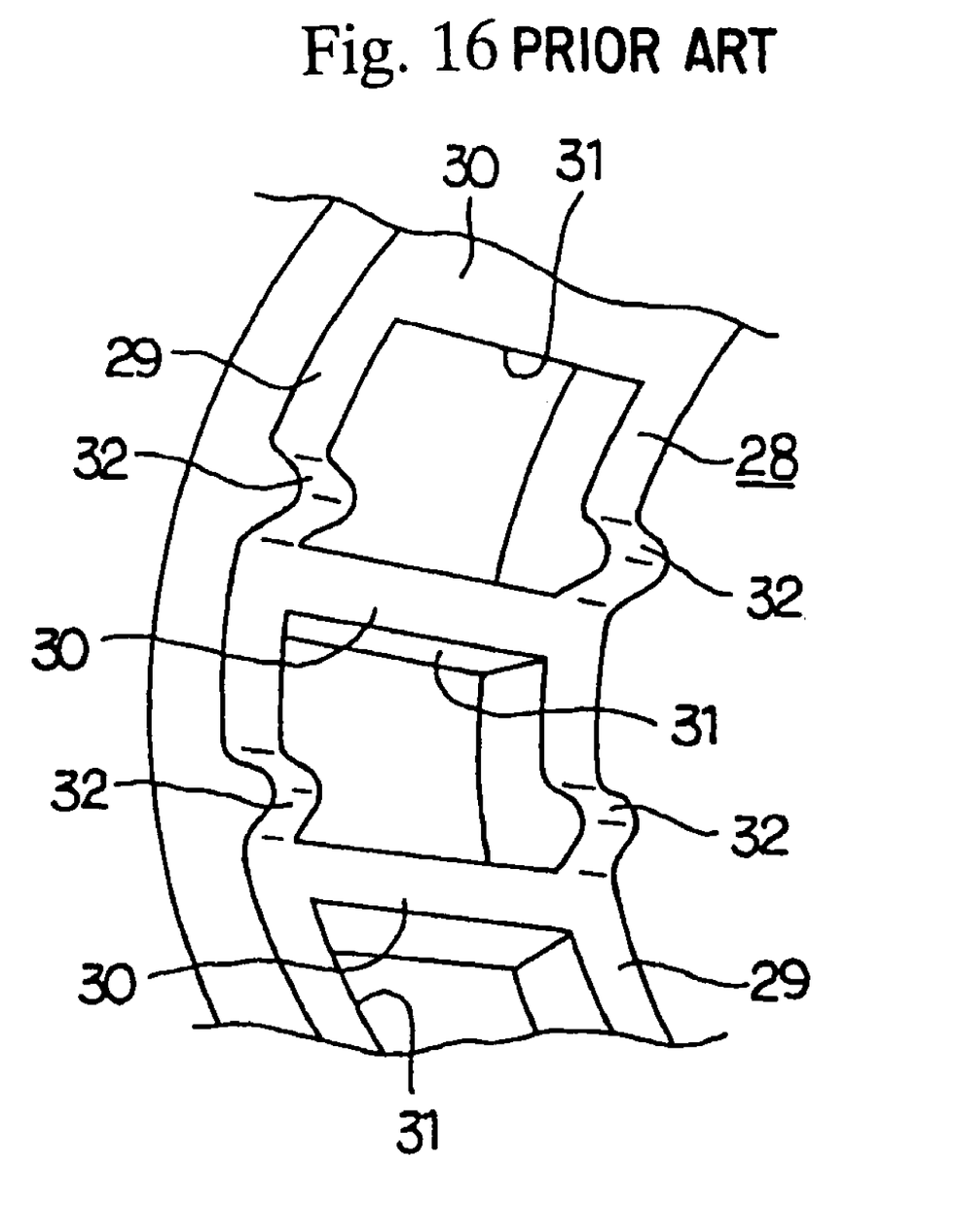
FIG. 16 is a perspective view of part of a retainer for clutch taken from the inner diameter side.

FIGS. 14 to 16 show one example of a prior art pulley apparatus with built-in one-way clutch as described in these publications. This pulley apparatus with built-in one-way clutch has an inner-diameter-side member, specifically a sleeve 8, that is fitted over the rotating shaft 3 of the alternator 1 (see FIG. 13). Also, there is a cylindrical outer-diameter-side member, specifically follower pulley 7a, that is located around this sleeve 8 such that it is concentric with the sleeve 8. In addition, there is a pair of support bearings 9 and a roller clutch 10, which is the one-way clutch, located between the outer peripheral surface of the sleeve 8 and the inner peripheral surface of the follower pulley 7a.

The sleeve 8 has a generally cylindrical shape, and is fitted onto one end of the rotating shaft 3 of the alternator 1 such that it rotates freely with the rotating shaft 3. Therefore, in the example shown in the figure, there is a male screw section formed around the outer peripheral surface on the tip end of the rotating shaft 3, and a screw hole 11 is formed in the middle section around the inner peripheral surface of the sleeve 8, such that the screw hole 11 can be screwed together with the male screw section. Moreover, an attachment hole section 12, having a hexagonal cross section, is formed on the tip end (left end in FIG. 14) on the inner peripheral surface of the sleeve 8 such that the tip end of a tool such as a hexagonal wrench can be attached to this attachment hole section 12. Furthermore, the base end on the inner peripheral surface of the sleeve 8 (right end in FIG. 14) is a circular hole section 13 that can be fitted over the tip end of the rotating shaft 3 at a portion closer to the middle of it such that there is no play between them.

Construction of assembling the sleeve 8 and the rotating shaft 3 such that they do not rotate relative to each other can be accomplished as well using other construction such as a spline joint, non-circular fit, key joint, or the like. Also, the center section of the outer peripheral surface of the sleeve 8 is a large-diameter section 14 that has a diameter that is larger than the other sections.

On the other hand, the tip end half on the outer peripheral surface of the follower pulley 7a is formed with a wave shaped cross section along the width direction such that part of an endless belt, called a poly V-belt, can be placed around it. Also, the aforementioned roller clutch 10 is placed in the middle in the axial direction in the space between the outer peripheral surface of the sleeve 8 and the inner peripheral surface of the follower pulley 7a, and support bearings 9 are placed on both ends in the axial direction of this space such that they are located on both sides in the axial direction of the roller clutch 10, respectively.

Of these, the support bearings 9 support the radial load that is applied to the follower pulley 7a, and make it possible for the follower pulley 7a to rotate relative to the sleeve 8. In the example shown in the figures, ball bearings of the deep-groove type are used as the support bearings 9. In other words, each of these support bearings 9 comprises an outer race 16 that has an outer-ring raceway 15 of the deep-groove type formed around its inner peripheral surface, an inner race 18 that has an inner-ring raceway 17 of the deep-groove type formed around its outer peripheral surface, and a plurality of balls 19 that are located between the outer-ring raceway 15 and inner-ring raceway 17 such that they rotate freely.

Also, the outer race 16 is fitted into and fixed around the inner peripheral surface near both ends of the follower pulley 7a, and the inner race 18 is fitted onto and fixed around the outer peripheral surface near both ends of the sleeve 8. In addition, in this state, one surface in the axial direction of the inner races 18 comes in contact with one of the axially opposite end surfaces (stepped surface) of the large-diameter section 14, respectively.

Moreover, in the example shown in the figures, by placing seal rings 20 between the inner peripheral surface on the opposite ends of the inner races 16 and the outer peripheral surface on the opposite ends of the inner races 18, respectively, the openings on both ends of the spaces where the balls 19 are located are covered.

Also, of the openings on both ends of the spaces where the balls 19 are located, it is possible to place the seal rings 20 only at the openings on the sides of the outside spaces of the pulley apparatus. However, as in the example shown in the figure, in the case where the seal rings 20 are placed also at the openings on the sides of the inside spaces of the pulley apparatus, it is preferred that through-holes be formed through part of the seal rings 20 on the sides of these inside spaces in order that the space between the pair of support bearings 9 is communicated with the spaces where the balls 19 are located. The reason for this is that it prevents the pressure in the space between both support bearings 9 from rising excessively when pressing the support bearings 9 between the inner peripheral surface of the follower pulley 7a and the outer peripheral surface of the sleeve 8.

Also, the aforementioned roller clutch 10 transmits rotation force between the follower pulley 7a and the sleeve 8 only when the pulley 7a rotates in relation to the sleeve 8 in a specified direction. In order to form this kind of roller clutch 10, an inner ring 21 for the clutch is securely fastened around the large-diameter section 14 of the sleeve 8 through interference fit.

In this specification, the outer peripheral surface of the sleeve 8 will be called "one peripheral surface", and the inner ring 21 for the clutch will be called the "protruding section".

This inner ring 21 for the clutch is made from steel plate, such as carburized steel plate, and is formed into a generally cylindrical shape by using a plastic working process such as pressing, and a cam surface 22 is formed on its outer peripheral surface. In other words, a plurality of concave sections 23, called the ramp section, are formed at equally space intervals around the circumference on the outer peripheral surface of the inner ring 21 for the clutch, to form a cam surface 22 on the outer peripheral surface. This cam surface 22 can also be formed directly on the outer peripheral surface of the large-diameter section 14. In this specification, this large-diameter section 14 will be called the "protruding section".

Of the inner peripheral surface of the outer ring 25 for the clutch, which is securely fitted into and fastened through interference fit in the middle section of the inner peripheral surface of the follower pulley 7a, at least the middle section in the axial direction that comes in contact with the rollers 26 (described later) is a simple cylindrical section. This kind of outer ring 25 for the clutch is also made from steel plate, such as carburized steel plate, and is formed into a generally cylindrical shape by using a plastic working process such as pressing, and inward facing flange-shaped collar sections 27a, 27b are formed on the axially opposite ends, respectively.

With respect to these collar sections 27a, 27b, the collar section 27a (left collar section in FIG. 14) is formed in advance when manufacturing the outer ring 25 for the clutch, so its material thickness is the same as the thickness of the cylindrical section of the outer ring 25 for the clutch. On the other hand, the other collar section 27b (right collar section in FIG. 14) is formed on the inside in the radial direction of the outer ring 25 for the clutch after the rollers 26 and the clutch retainer 28 (described later) are assembled, and therefore made thin.

Also, the plurality of rollers 26, which together with the inner ring 21 and outer ring 25 for the clutch make up the roller clutch 10, are supported in the clutch retainer 28, which is fitted around the inner ring 21 for the clutch and can not rotate with respect to the inner ring 21 for the clutch, such that they can freely rotate and displace a little in the circumferential direction. This clutch retainer 28 is made of a synthetic resin (for example, a synthetic resin such as polyamide 66, polyamide 46, or polyphenylene sulfide in which glass fibers are mixed by an amount of about 20%) formed into a generally basket-shaped cylindrical shape and comprises a pair of ring-shaped rims 29, and a plurality of columns 30 that link the rims 29 with each other.

Also, pockets 31 are defined by the inside surfaces of the rim sections 29 and the side surfaces in the circumferential direction of the columns 30. The pockets 31 hold the rollers 26 such that they can freely roll and slightly displace in the circumferential direction.

Moreover, the circular arc-shaped convex sections 32 are formed at a plurality of locations on the inner peripheral surface of each of the rim sections 29 and engaged with the concave sections 23 that are formed on the outer peripheral surface of the inner ring 21 for the clutch, so that the clutch retainer 28 is mounted on the inner ring 21 for the clutch such that it cannot rotate relative to the inner ring 21 for the clutch.

Also, there are springs (not shown in the figure), such as plate springs or synthetic resin springs, which are integrated with the clutch retainer 28 and located between the column sections 30 of the clutch retainer 28 and the rollers 26. There is a cylindrical-shaped space between the cam surface 22 and the inner peripheral surface (cylindrical surface) in the middle section of the outer ring 25 for the clutch. The aforementioned springs elastically press the rollers 26 in the circumferential direction of the clutch retainer 28 toward the section of the cylindrical-shaped space where the dimension of the width in the radial direction is narrower.

Moreover, the both axial end surfaces of the clutch retainer 28 closely face the inside surfaces of the collars 27a, 27b of the outer ring 25 for the clutch to prevent the clutch retainer 28 from displacement in the axial direction.

When using the pulley apparatus with built-in one-way clutch that is constructed as described above, the rollers 26 bite into the section where the width in the radial direction of the cylindrical-shaped space is narrower when the follower pulley 7a rotates in a specified direction relative to the sleeve 8, which makes it impossible for the follower pulley 7a to rotate relative to the sleeve 8. This state is called the locked state.

On the other hand, when the follower pulley 7a rotates in the opposite direction of the specified direction relative to the sleeve 8, the rollers 26 move out of the way to the section where the width in the radial direction of the cylindrical space is wider, and makes it possible for the follower pulley 7a to rotate freely relative to the sleeve 8. This state is called the overrun state.

There are the following two reasons for using a pulley apparatus with built-in one-way clutch for an alternator that has the construction described above.

The first reason is for extending the life of the endless belt. For example, when the drive engine is a diesel engine, and it is rotating at a low rpm such as during idling, fluctuation in the rotational angular velocity of the crankshaft becomes large. As a result, the running speed of the endless belt that extends around the drive pulley also fluctuates small. On the other hand, the rotating shaft 3 of the alternator that is rotated and driven by this endless belt by way of the follower pulley does not fluctuate so suddenly due to the inertia mass of the rotating shaft 3 and the rotor that is fixed to the rotating shaft 3.

However, when the follower pulley is just fastened to the rotating shaft, there is a tendency for the endless belt and follower pulley to rub in both directions due to the fluctuations in the rotational angular velocity of the crankshaft. As a result, stress acts repeatedly in different directions on the endless belt in a rubbing relation with the follower pulley, and accordingly it becomes easy for slipping to occur between the endless belt and the follower pulley, or the life of the endless belt becomes short.

Therefore, by using a pulley apparatus with built-in one-way clutch for an alternator as this follower clutch, rotational power is freely transmitted from the follower pulley to the rotating shaft 3 when the running speed of the endless belt is constant or increases, and conversely, the follower pulley rotates freely with respect to the rotating shaft 3 when the running speed of the endless belt decreases. In other words, when the running speed of the endless belt decreases, the rotational angular velocity of the follower pulley becomes slower than the rotational angular velocity of the rotating shaft, and thus prevents strong rubbing at the area of contact between the endless belt and the follower pulley. In this way, the direction of the stress acting on the area of rubbing between the follower pulley and endless belt is made constant, and thus prevents slipping from occurring between the endless belt and the follower pulley, and prevents a drop in life of the endless belt.

The second reason is for improving the efficiency of power generation of the alternator. The rotating shaft 3, to which the alternator rotor is fastened, is driven and rotated by the automobile drive engine by way of the endless belt and follower pulley. In the case of using a fixed follower pulley, when the rotational velocity of the drive engine drops suddenly, there is a sudden drop in the rotational velocity of the rotor, and the amount of power generated by the alternator also decreases suddenly.

By using a pulley apparatus with built-in one-way clutch for an alternator as the follower clutch of the alternator, the rotational velocity of the rotor drops gradually due to the inertial force and power generation continues even when the rotational velocity of the drive engine drops suddenly. As a result, in comparison to the case of using a fixed follower pulley, it is possible to increase the amount of power generated by the alternator by efficiently using the kinetic energy of the rotating shaft and rotor.

In the case of the prior art construction described above, displacement of the clutch retainer 28 in the axial direction is prevented by the pair of collar sections 27a, 27b that are formed on both ends of the outer ring 25 for the clutch. In other words, when the clutch retainer 28 tries to move in the axial direction during overrun when there is relative rotation between the follower pulley 7a and the sleeve 8, the inside surface of one of the collar sections 27a, 27b comes in contact (sliding contact) with the corresponding end surface in the axial direction of the clutch retainer 28, and prevents the displacement of clutch retainer 28 in the axial direction.

However, in the case of the pulley apparatus with built-in one-way clutch for an alternator described above, the relative rotational velocity between the pulley 7a and the sleeve 8 can reach from several hundred revolutions per min (rpm) to several thousand revolutions per minute in extreme cases. Therefore, when there is sliding contact between the axially opposite end surfaces of the clutch retainer 28 and the inside surfaces of the collar sections 27a, 27b, respectively, there is a possibility of wear of the axially opposite end surfaces of the clutch retainer 28, or there is a possibility that the friction heat that occurs due to sliding contact between the axially opposite end surfaces of the clutch retainer 28 and the inside surfaces of the collar sections 27a, 27b may become excessive.

Also, in the case that the powder generated due to wear of the axially opposite end surfaces of the clutch retainer 28 is mixed with the grease used for lubricating the roller clutch 10, there is a possibility that there will be a drop in the lubricating ability of this grease. Moreover, in the case that the friction heat, which is generated in the area of sliding contact, becomes excessive, there is a possibility that the grease will degrade quickly due to heat. Degradation of the grease causes the roller clutch 10 to lose durability and is not desirable.

These kinds of problems also occur in the case of construction where there is not a pair of collar sections 27a, 27b, and where the axially opposite end surfaces of the clutch retainer 28 come in sliding contact with another member that rotates relative to the clutch retainer 28.

Moreover, in the case of the clutch retainer that is disclosed in Japanese patent publication No. Toku Kai 2001-32911, which was assigned to the same assignee as the present invention, there are attachment sections on both sides in the axial direction of the clutch retainer, and when the clutch retainer is elastically deformed and fitted onto the inner ring for the roller clutch, the aforementioned attachment sections hold the inner ring for the roller clutch between them and limit displacement in the axial direction of the clutch retainer.

However, depending on the material of the retainer and the interference between the attachment sections and the inner ring for the roller clutch, there existed problems in that when elastically deforming the clutch retainer and fitting it onto the inner ring for the roller clutch, the retainer could break, or the interference would be too large, so that the fitting force would be too large making fitting difficult, or the interference would be too small, so that the clutch retainer would become separated easily.

DISCLOSURE OF THE INVENTION

The rotation transmission apparatus with built-in one-way clutch of this invention is invented to solve the aforementioned problems.

Similar to the prior art construction shown in FIGS. 14 to 16, the rotation transmission apparatus with built-in one-way clutch of this invention comprises: an inner-diameter-side member that is fastened to an end of the rotating shaft; a cylindrical-shaped outer-diameter-side member that is located around the inner-diameter-side member such that it is concentric with the inner-diameter-side member; a one-way clutch that is located between the middle section in the axial direction of the outer peripheral surface of the inner-diameter-side member and the middle section in the axial direction of the inner peripheral surface of the outer-diameter-side member; and a pair of support bearings that are located on both sides in the axial direction of the one-way clutch between the outer peripheral surface of the inner-diameter-side member and the inner peripheral surface of the outer-diameter-side member. The one-way clutch freely transmits rotational power between the outer-diameter-side member and the inner-diameter-side member only when the outer-diameter-side member rotates relative to the inner-diameter-side member in a specified direction. The pair of support bearings support the radial load that is applied to the outer-diameter-side member, while at the same time making it possible for relative rotation between the inner-diameter-side member and the outer-diameter-side member.

Also, a protruding section is formed all the way around one of the inner peripheral surface of the outer-diameter-side member and the outer peripheral surface of the inner-diameter-side member at the axially middle section thereof such that it protrudes in the radial direction from that peripheral surface. Part of the one peripheral surface that includes the peripheral surface of the protruding section is engaged with part of the peripheral surface of the clutch retainer of the one-way clutch in an interlocking manner, so that the clutch retainer is capable of rotating freely together with the member with the protruding section.

Furthermore, retaining sections are formed on both ends in the axial direction of the clutch retainer, in the sections that protrude further in the axial direction than the axially opposite end edges of the protruding section, such that they protrude toward the one peripheral surface, and these retaining sections hold the protruding section between them on both sides in the axial direction so as to limit displacement in the axial direction of the clutch retainer and to prevent the axially opposite end surfaces of the clutch retainer from coming in contact with members rotating relative to the clutch retainer.

Furthermore, one feature of the rotation transmission apparatus with built-in one-way clutch of this invention is that the clutch retainer is made of a material of synthetic resin with reinforcement fibers mixed in such that the percentage of the mixed-in reinforcement fibers is 25% or less.

As described above, in the case of the rotation transmission apparatus with built-in one-way clutch of this invention, the clutch retainer can sufficiently deform elastically, so the clutch retainer will not break when inserting it in the inner ring for the roller clutch.

Furthermore, another feature of the pulley apparatus with built-in one-way clutch of this invention is that the one peripheral surface is the outer peripheral surface of the inner-diameter-side member, and the outer ring for the clutch is fitted inside the middle section in the axial direction of the outer-diameter-side member and has a pair of ring sections on both ends in the axial direction that extend inward in the radial direction such that the inside surfaces of the ring sections that face each other come very close to and face the axially opposite end of the clutch retainer, respectively.

In the case of the construction of the other feature, there is always a clearance between the inside surfaces of the pair of ring sections which are formed on both ends in the axial direction of the outer ring for the clutch, and the axially opposite end surfaces of the clutch retainer. Therefore, this clearance is used as a grease pocket in order that the one-way clutch is sufficiently lubricated. In other words, when using the rotation transmission apparatus with built-in one-way clutch, centrifugal force is applied on the grease in this clearance. Also, the grease that receives the centrifugal force in this way spreads evenly over the inner peripheral surface of the outer ring for the clutch. As a result, it is possible to adequately supply grease to the area between the surface of the locked members of the one-way clutch and the inner peripheral surface of the outer ring for the clutch, which is the area that requires grease during overrun. Therefore, it is possible to maintain a state of lubrication of the clutch over a long period of time, as well as it is possible to obtain a rotation transmission apparatus with built-in one-way clutch with sufficient durability.

THE BEST EMBODIMENT TO WORK THE INVENTION

The embodiment of the invention will be explained with reference to the accompanying drawings.

FIGS. 1 to 4 show a first example of the embodiment of the invention. A feature of this invention is that the displacement in the axial direction of the clutch retainer 28a is limited, so that it is possible to prevent contact (sliding contact) between the axially opposite end surfaces of the clutch retainer 28a and the inside surfaces of the pair of collar sections (ring sections) 27a, 27b of the outer ring 25 for the clutch. The construction and function of other parts, including that the clutch retainer 28a rotates freely together with the inner ring 21 for the clutch based on the engagement between the plurality of convex sections 32 that are formed on the inner peripheral surface of the clutch retainer 28a and the plurality of concave sections 23 that are formed on the outer peripheral surface of the inner ring 21 for the clutch, are substantially the same as in the prior art construction described above and shown in FIGS. 14 to 16. Therefore, the like code numbers will be given to like parts, and explanations of redundant parts will be omitted or simplified. The explanation below will center on the features of this invention.

In the case of this example, the dimension $L_{28a}$ in the axial direction of the clutch retainer 28a is greater than the dimension $L_{21}$ in the axial direction of the inner ring 21 for the clutch ($L_{28a} > L_{21}$). Also, a first retaining section, specifically retaining piece 33 is formed on the inner-diameter-side on one end (right end in FIGS. 1 and 2) in the axial direction of the clutch retainer 28a, and a second retaining section, specifically retaining collar section 34 is formed on the inner peripheral surface on the other end in the axial direction (left end in FIGS. 1 and 2). The inner ring 21 for the clutch is held on both sides in the axial direction between and by the engagement section 35, which is formed on the tip end of the retaining piece 33, and the retaining collar section 34.

Figure 1:
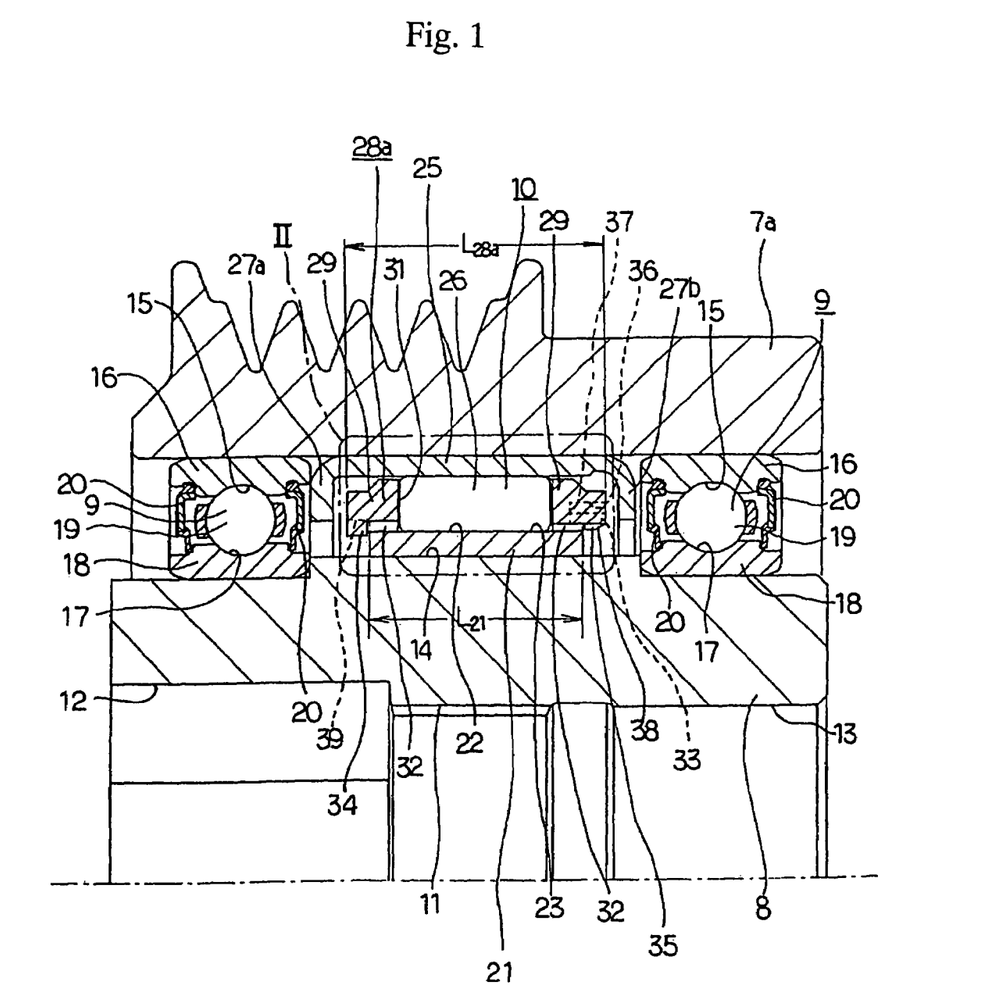
FIG. 1 is a cross sectional view of a half of a first example of the embodiment of the present invention.
Figure 2:
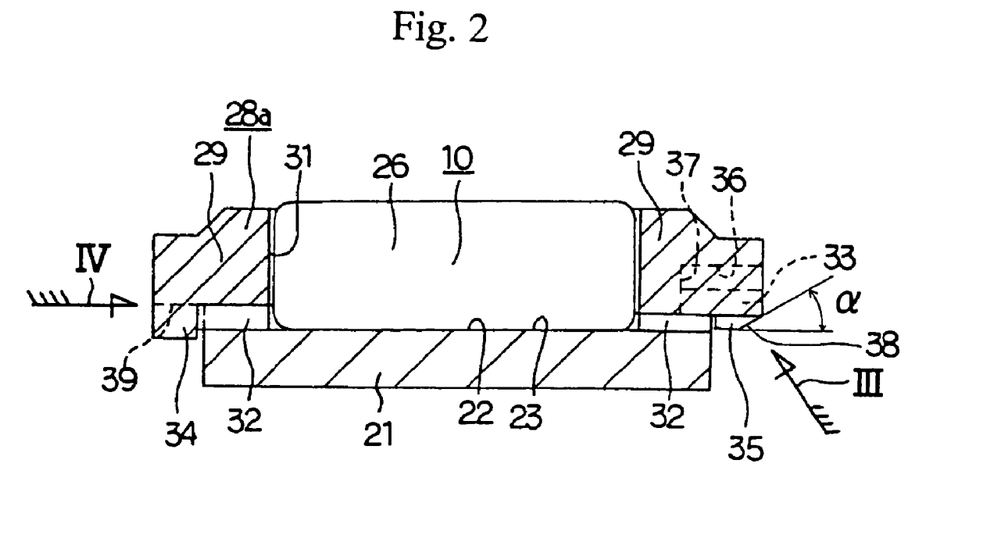
FIG. 2 is an enlarged view of Portion II in FIG. 1 to show a retainer for clutch, roller and an inner ring for clutch only.
Figure 3:
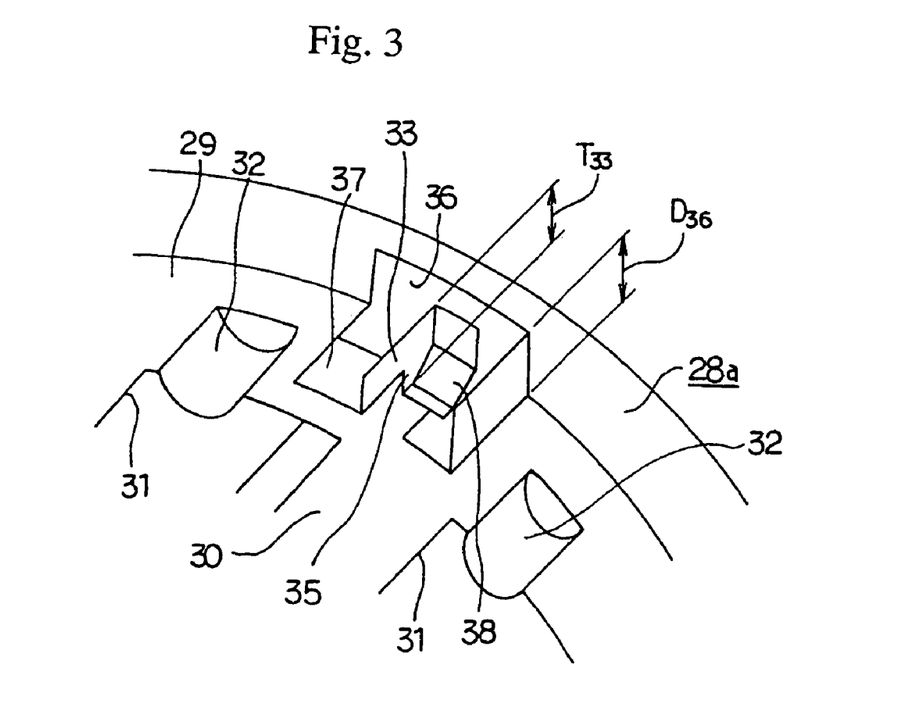
FIG. 3 is a view in the direction III in FIG. 2.
Figure 4:
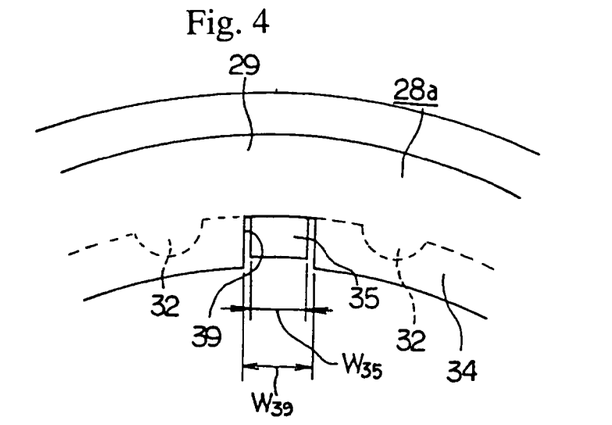
FIG. 4 is a view in the direction IV in FIG. 2.

The retaining piece 33 is located at one location or a plurality of locations around the circumference on the inner-diameter side of the one end of the clutch retainer 28a, as shown in detail in FIG. 3. In other words, in order to form this retaining piece 33, a relief groove 36 is formed between adjacent convex sections 32 in the circumferential direction on the inner peripheral surface of one end of the clutch retainer 28a such that it is open in the inner peripheral surface of the clutch retainer 28a and in the surface on the one end. Also, the retaining piece 33 is formed such that it protrudes in the axial direction from the middle section of the inner-diameter-side of the axially inside surface 37 of the relief groove 36. An engagement section 35 is provided on the inner peripheral surface of the tip end of the retaining piece 33 such that it protrudes inwards in the radial direction. The engagement section 35 in a free state protrudes radially inwards than the inner peripheral surface of the clutch retainer 28a.

Also, there is an inclined section 38 formed on one end of the inner peripheral surface of the engagement section 35 such that it slants outward in the radial direction as it gets near the one end edge.

The depth $D_{36}$ of the relief groove 36 in the radial direction of the clutch retainer 28a is large enough that the engagement section 35 of the retaining piece 33 can be moved out of the way inside the relief groove 36 so that the clutch retainer 28a can be pressed against the outer peripheral surface of the inner ring 21 for the clutch when assembling the clutch retainer 28a as described later. For example, the depth $D_{36}$ of the relief groove 36 is equal to or greater than the thickness $T_{33}$ of the tip end of the retaining piece 33 ($D_{36} \geq T_{33}$).

Moreover, the retaining collar 34 protrudes inward in the radial direction from the inner peripheral surface on the other end of the clutch retainer 28a, and is formed all the way around or intermittently around the circumference. Also, in a section of the retaining collar 34 which is aligned with the retaining piece 33 in the circumferential direction, there is a notch 39 that has a width dimension $W_{39}$ that is equal to or greater than the width dimension $W_{35}$ of the engagement section 35 of the retaining piece 33 ($W_{39} \geq W_{35}$). This notch 39 is formed so that when making the clutch retainer 28 out of synthetic resin by injection molding (the retaining piece 33 is formed by axial drawing), it is possible to remove in the axial direction part of the mold that is used for injection molding.

The plurality of convex sections 32 are formed on the inner peripheral surface of the clutch retainer 28a, and the plurality of concave sections 32 are formed on the outer peripheral surface of the inner ring 21 for the clutch.

In the case of mounting the clutch retainer 28a mentioned above on the outer peripheral surface of the inner ring 21 for the clutch, the phase in the circumferential direction of the plurality of convex sections 32 and the plurality of concave sections 23 matches. Also, in this state, the clutch retainer 28a is pushed against the outer peripheral surface of the inner ring 21 for the clutch from the side of the other end (left end side in FIGS. 1 and 2) of the inner ring 21 for the clutch. As the inclined surface 38 that is formed on the engagement section 35 of the retaining piece 33 is guided by the outer peripheral edge on the other end of the inner ring 21 for the clutch, when pushing the clutch retainer 28a, the tip end of the retaining piece 33 is elastically deformed outward in the radial direction.

The angle α of the inclined surface of the engagement section with respect to the axis should be 35 degrees or less. When the angle is made large, the insertion load becomes extremely large, and insertion becomes difficult to perform by hand. On the other hand, when the angle is small, insertion is easy, however, in order for the inclined surface to securely come in contact with the outer peripheral edge of the inner ring for the clutch during insertion, the width of the engagement section of the retainer must be made large due to the interference, and thus the space in the axial direction becomes large. Therefore, it is not practical to make the angle α extremely small. It is preferred that this angle α be between 25 to 35 degrees.

Taking the expansion of the retainer and the inner ring for the clutch at maximum temperature during operation (approximately 110 to 140° C.), interference in the radial direction between the engagement section of the retainer and the inner ring for the clutch should be set so that no gaps occur.

In order to make it easy to insert the clutch retainer in the inner ring for the clutch, and in order that the engagement section does not come out after insertion, the direction of the outer diameter shape of the inner ring for the clutch is regulated. In other words, the insertion side is the side where there is large roll-over of the outer diameter shape of the inner ring for the clutch, and the side opposite from the insertion side is the side where there is little roll-over of the outer diameter shape of the inner ring for the clutch. When the inner ring for the clutch is manufactured by pressing, the insertion side is the roll-over side (curl side during pressing) and the side opposite from the insertion side is the side with little roll-over (bottom side during pressing).

Due to this elastic deformation, the engagement section 35 moves out of the way inside the relief groove 36 and passes by the outer peripheral surface of the inner ring 21 for the clutch. Also, after it has passed by the outer peripheral surface of the inner ring 21 for the clutch, the tip end of the retaining piece 33 elastically restores in dimension inward in the radial direction, and the inner ring 21 for the clutch is held in the axial direction between the engagement section 35 and the retaining collar 34.

Moreover, in the case of this example, axial displacement of the clutch retainer 28a is restricted by holding the inner ring 21 for the clutch between the engagement section 35 and the retaining collar section 34 in the axial direction. The outer ring 25 for the clutch rotates relative to the clutch retainer 28a. Also, by restricting the clutch retainer 28a as described above, the axially opposite end surfaces of the clutch retainer 28a can be prevented from coming in contact with the inside surfaces of the pair of collar sections 27a, 27b that are formed on the axially opposite ends of the outer ring 25 for the clutch. In other words, in this embodiment, the dimensions are such that when there is a tendency for the clutch retainer 28a to move in the axial direction, either the engagement section 35 or retaining collar 34 comes in contact with the corresponding end surface in the axial direction of the inner ring 21 for the clutch before either one of the end surfaces in the axial direction of the clutch retainer 28a comes in contact with the corresponding inside surface of one of the collar sections 27a, 27b.

As described above, in the case of the pulley apparatus with built-in one-way clutch of this invention, it is possible to prevent the opposite end surfaces of the clutch retainer 28a from coming in contact (sliding contact) with the inside surfaces of the pair of collar sections 27a, 27b that rotate relative to the clutch retainer 28a. Moreover, there is no wear on either of the end surfaces in axial direction of the clutch retainer 28a, nor is friction heat generated in the area of both ends surfaces in the axial direction of the clutch retainer 28a. Therefore, it is possible to prevent abrasion powder from the clutch retainer 28a from getting mixed into the grease used for lubricating the roller clutch 10, and thus it is possible to prevent the grease from becoming exposed to high temperatures and degrading too quickly.

Furthermore, in this embodiment, there is always a clearance between the inside surfaces of the pair of collar sections 27a, 27b and both end surfaces in the axial direction of the clutch retainer 28*a*. Therefore, this clearance is used as a grease pocket, making it possible to adequately lubricate the roller clutch 10. In other words, when the pulley apparatus with built-in one-way clutch is operating, centrifugal force acts on the grease that is in this clearance. The grease that is subject to this centrifugal force uniformly spreads over the inner peripheral surface of the outer ring 25 for the clutch. As a result, during overrun when there is relative rotation between the follower pulley 7*a* and the sleeve 8, it is possible to adequately supply grease to the parts that require grease, or in other words, between the rolling contact surfaces of the plurality of rollers 26 of the roller clutch 10 and the inner peripheral surface of the outer ring 25 for the clutch. Therefore, it is possible to maintain a good state of lubrication in the roller clutch 10 over a long period of time, and obtain a pulley apparatus with built-in one-way clutch that is sufficiently durable.

The clutch retainer is made of synthetic resin (for example polyamide 66, polyamide 46, or polyphenylene sulfide in which glass fibers are mixed in). However, for construction such as in this example where the engagement section is elastically deformed in the radial direction and inserted in the inner ring for the clutch, the material must be such that the engagement section does not break when deformed. When the amount of glass fibers that are mixed in is increased, it becomes easier for the engagement section to break when the specified deformation is applied, so it is necessary to restrict the amount of glass fibers that are mixed in. From the tests performed by the inventors, it was confirmed that if the amount of glass fibers that are mixed in is 25% or less, there is no breakage. It is preferred that the mixing amount be 15% or less.

It is also possible to have construction with no relief groove in the engagement section. In the case of construction with no relief groove, the entire retainer must be deformed and inserted. In order to make it easy to deform, it is preferred that there be only a few engagement sections. Preferably there should be engagement sections at one or two locations. In the case of two locations, by locating the engagement sections at nearly symmetric locations or at adjacent locations around the circumference, it becomes easier to deform the retainer. In the case of three locations or more, deformation becomes easy by placing the engagement sections at locations with uneven pitch.

Figure 5:
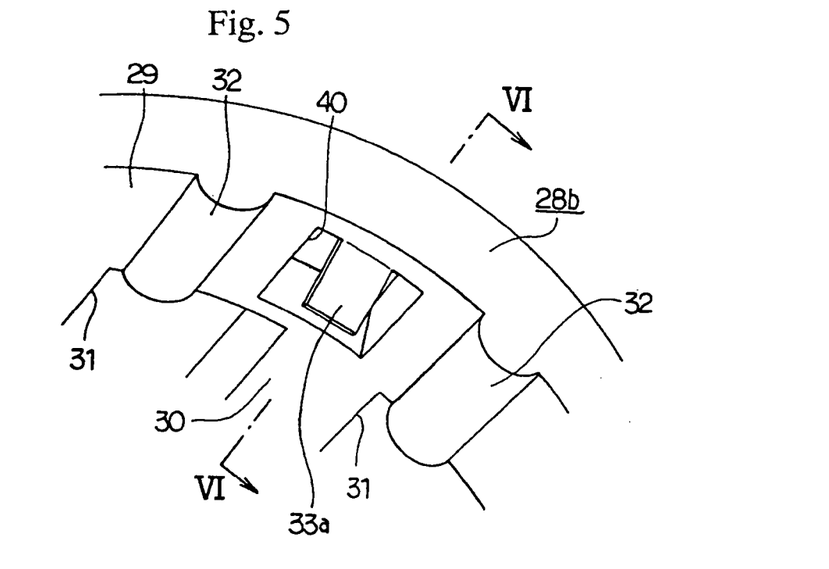
FIG. 5 is a view similar to FIG. 3 to show a second example of the embodiment of the present invention.
Figure 6:
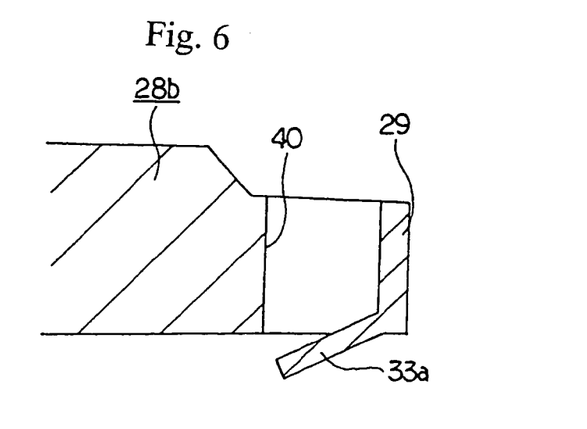
FIG. 6 is a cross sectional view taken along the line VI—VI in FIG. 5.

Next, FIGS. 5 and 6 show a second example of the embodiment of the invention. In this example, the shape of the retaining piece 33*a* that is formed on inner-diameter side of one end of the clutch retainer 28*b* is different than in the first example described above. In this example, in order to form this kind of retaining piece 33*a*, a rectangular through-hole 40 is formed in the section between a pair of convex sections 32 which are adjacent in the circumferential direction, such that the through-hole 40 is provided through part of the clutch retainer 28*b* in the radial direction. Also, the edge of the base end of the retaining piece 33*a* is connected to an inside surface portion on the inner-diameter side on one end side of the through-hole 40. This retaining piece 33*a*, in the free state, slants inward in the radial direction as it goes toward the center in the axial direction of the clutch retainer 28*b*.

In the case of this example, the clutch retainer 28*b*, including the retaining piece 33*a* and through-hole 40 section, is made by radial draw injection molding. Therefore, in this example, it is not necessary to form a notch in part of the retaining collar section 34 (see FIG. 1, 2 and 4), which is otherwise formed on the inner peripheral surface on the other end of the clutch retainer 28*b* for making it possible to perform axial draw injection molding. In the case of this example, constructed as described above, the retaining piece 33*a* passes by the outer peripheral surface of the inner ring 21 for the clutch while elastically moving out of the way inside the through-holes 40, when pushing the clutch retainer 28*b* against the outer peripheral surface of the inner ring 21 for the clutch (see FIGS. 1 and 2). Also, after it has passed by the outer peripheral surface of the inner ring 21 for the clutch, the retaining piece 33*a* elastically restores in dimension inward in the radial direction, and the inner ring 21 for the clutch is held in the axial direction between the tip end of the retaining piece 33*a* and the retaining collar section 34. The other construction and functions are substantially the same as for the first example described above.

Figure 7:
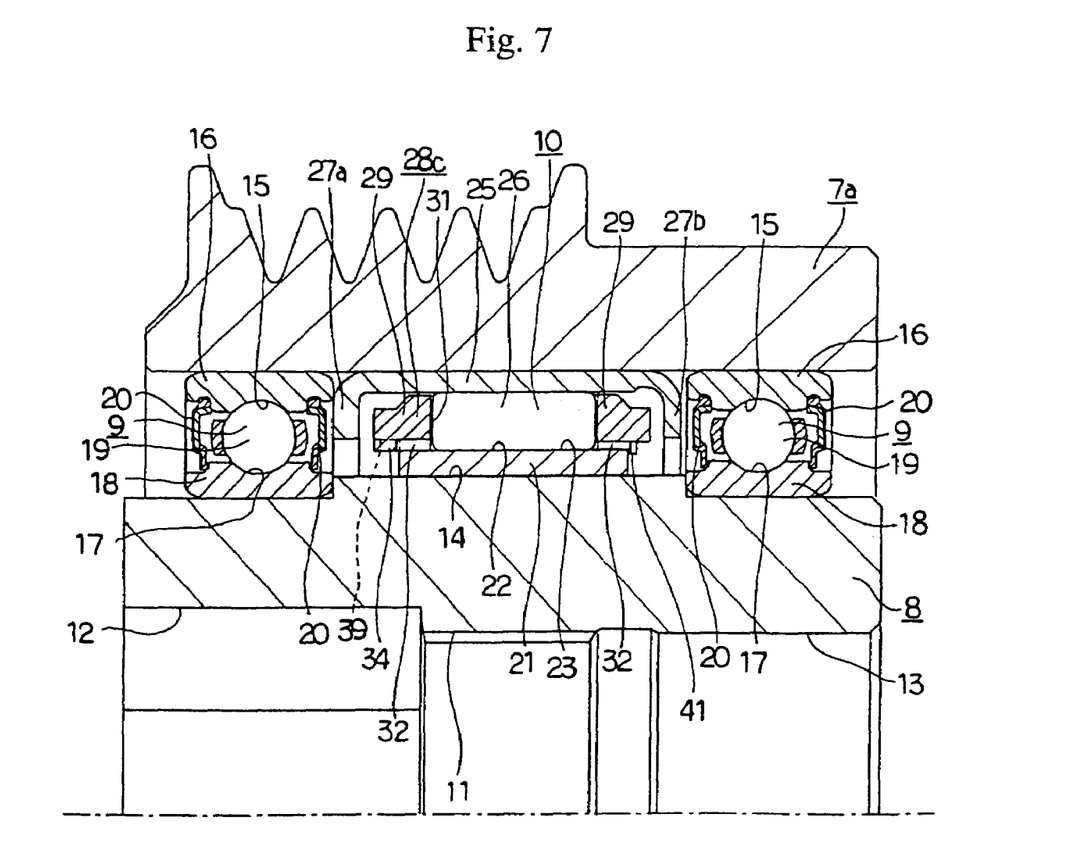
FIG. 7 is a cross sectional view of a half of a third example of the embodiment of the present invention.
Figure 8:
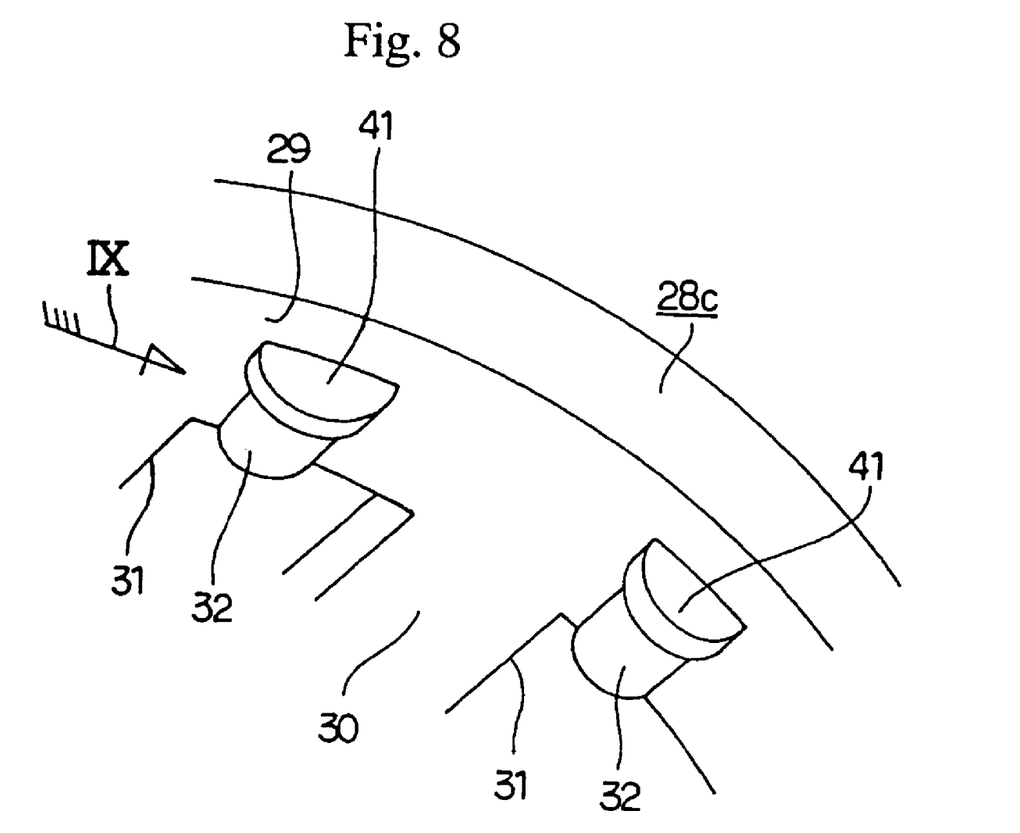
FIG. 8 is a view similar to FIG. 3 to show the third example of the embodiment of the present invention.
Figure 9:
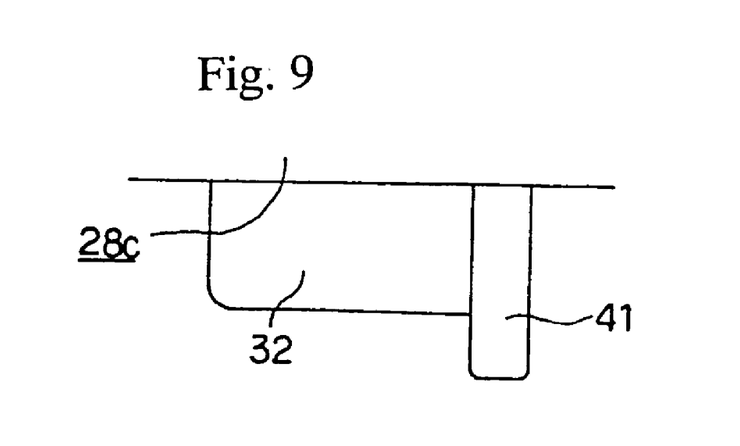
FIG. 9 is a view in the direction IX in FIG. 8.

Next, FIGS. 7 to 9 show a third example of the invention. In the case of this example, with respect to the plurality of convex sections 32 that are formed around the inner peripheral surface of the rim section 29 on one side (right side in FIG. 7) of the clutch retainer 28*c*, there is a retaining section, specifically semi-circular retaining plate section 41 formed on one end of at least one of the convex sections 32. The inner ring 21 for the clutch is held from the axially opposite sides between the part of these retaining plate sections 41 that protrudes further inward in the radial direction than the convex sections 32 and the retaining collar section 34 that is formed on the inner peripheral surface on the other end of the clutch retainer 28*c*.

When placing the clutch retainer 28*c* around the outer peripheral surface of the inner ring 21 for the clutch, as pushing the clutch retainer 28*c*, the retaining plate section 41 elastically deforms one end of the clutch retainer 28*c* outward in the radial direction while passing over the outer peripheral surface of the inner ring 21 for the clutch. The other construction and functions are substantially the same as for the first example described above.

It is preferred that the quotient of the interference in the radial direction between the diameter of the inscribed circle of the support plate section and the inner ring for the clutch divided by the diameter of the inscribed circle of the support plate section be between 0.01 to 0.04.

Figure 10:
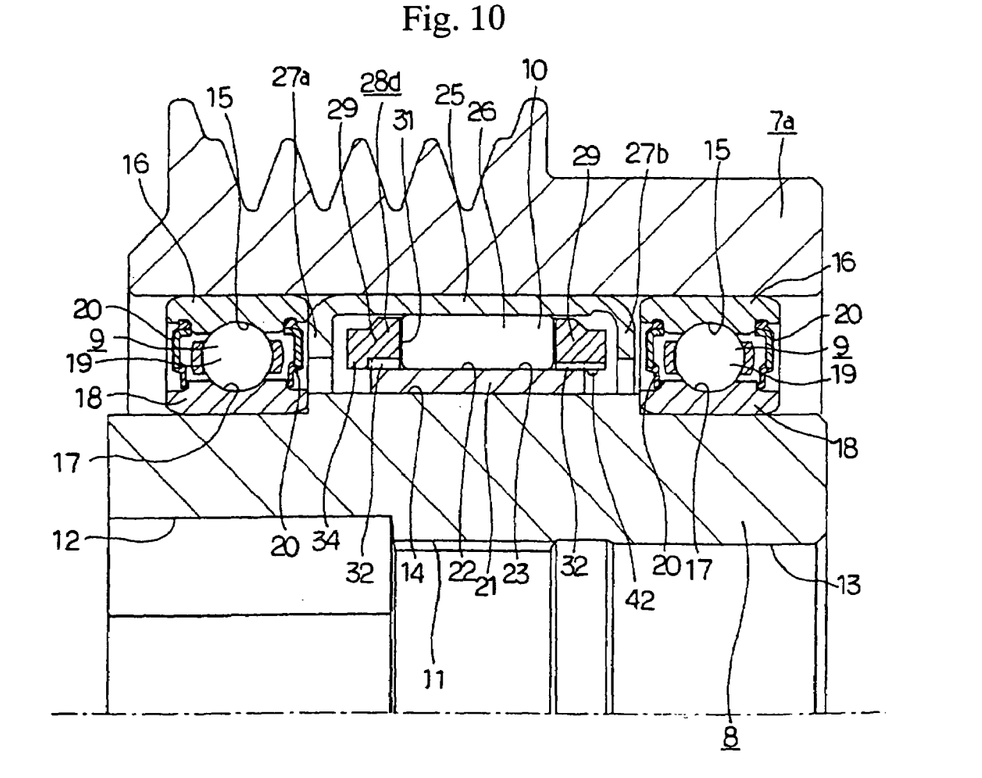
FIG. 10 is a cross sectional view of a half of a fourth example of the embodiment of the present invention.
Figure 11:
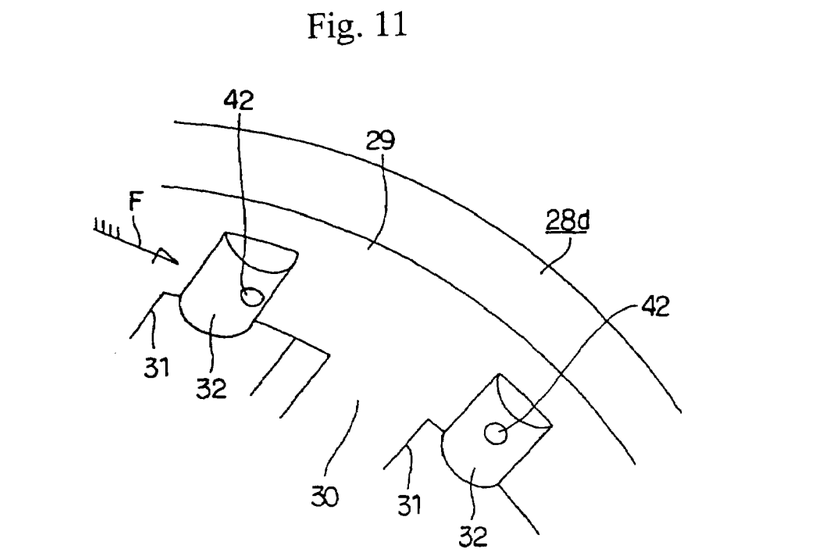
FIG. 11 is a view similar to FIG. 3 to show the fourth example of the embodiment of the present invention.
Figure 12:
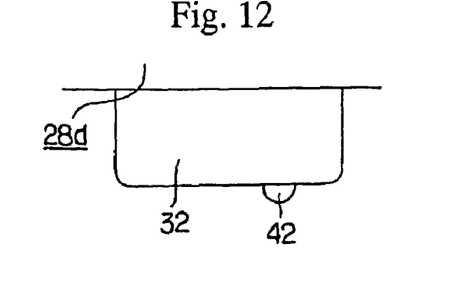
FIG. 12 is a view in the direction XII in FIG. 11.

Next, FIGS. 10 to 12 show a fourth example of the embodiment of the invention. In this example, there is a plurality of convex sections 32 that are formed around the inner peripheral surface of the rim section 29 on one side (right side in FIG. 10) of the clutch retainer 28*d*. Also, there are semi-circular protrusions (retaining sections) 42 formed near one end of at least one of the convex sections 32 such that they protrude inward in the radial direction. Also, there is a retaining collar section 34 that is formed around the inner peripheral surface of the other end of the clutch retainer 28*d*. The inner ring 21 for the clutch is held from the axially opposite sides between these protrusions 42 and the retaining collar section 34. The other construction and functions are substantially the same as for the third example described above.

In the embodiments described above, the case of using a roller clutch as the one-way clutch was explained, however, substantially the same effects can be obtained when this invention uses a one-way clutch of other conventional construction, such as a sprag clutch or cam clutch.

When using a cam clutch, the peripheral surfaces that are engaged with the cam are all cylindrical surfaces. Therefore, there is a possibility that none of the members of the cam clutch is fitted with any of the peripheral surfaces. In that case, a protruding section having a stepped surface is formed directly on the one peripheral surface such that the stepped surface is placed between the one peripheral surface and the axially opposite sides, to control the position in the axial direction of the clutch retainer.

Moreover, the pair of support bearings are not limited to being a pair of ball bearings, and substantially the same effect can be obtained as well in the case of using a pair of roller bearings or in the case of using one ball bearing and one roller bearing.

Furthermore, in the embodiments described above, an example of applying the invention to the pulley of an alternator is given, however, the invention is not limited to that. For example, in the case of using the invention in the rotation transmission unit of a starter motor in the starting apparatus of an automobile, a pinion gear is formed on the outer peripheral surface of the cylindrical-shaped outer-diameter-side member such that it freely meshes with a ring gear that is formed on the outer peripheral surface of the flywheel.

INDUSTRIAL APPLICATION

The rotation transmission apparatus with built-in one-way clutch of this invention, is constructed and functions as described above, so the clutch retainer deforms elastically enough that it does not break when inserted into the inner ring for the clutch. Also, grease in the grease pocket is supplied to the clutch by centrifugal force, so it is possible to maintain a good lubrication condition for the clutch over a long period of time, as well as improve the durability of the clutch.

What is claimed is:

1. A rotation transmission apparatus with built-in one-way clutch comprising:

an inner-diameter-side member that is fastened to the end of a rotating shaft; a cylindrical-shaped outer-diameter-side member that is located around the inner-diameter-side member such that it is concentric with the inner-diameter-side member; a one-way clutch that is located between the middle in the axial direction of the outer peripheral surface of the inner-diameter-side member and the middle in the axial direction of the inner peripheral surface of the outer-diameter-side member; such that the one-way clutch freely transmits rotational power between the outer-diameter-side member and the inner-diameter-side member only when the outer-diameter-side member rotates relative to the inner-diameter-side member in a specified direction, and a pair of support bearings that are located on the axially opposite sides of the one-way cutch between the outer peripheral surface of the inner-diameter-side member and the inner peripheral surface of the outer-diameter-side member, such that the pair of support bearings support the radial load that is applied to the outer-diameter-side member, while at the same time making it possible for relative rotation between the inner-diameter-side member and the outer-diameter-side member, wherein a protruding section is formed all the way around one of the inner peripheral surface of the outer-diameter-side member and the outer peripheral surface of the inner-diameter-side member at the axially middle section thereof such that it protrudes in the radial direction from that surface, and the one-way clutch has a clutch retainer, wherein part of the one peripheral surface that includes the peripheral surface of the protruding section is engaged with part of the peripheral surface of the clutch retainer in an interlocking manner, so that the clutch retainer is capable of rotating together with the member with the protruding section, wherein retaining sections are formed in the axially opposite end edges of the clutch retainer, in the sections that protrude further in the axial direction than the axially opposite end edges of the protruding section, such that they protrude toward the one peripheral surface, and that the retaining sections hold the protruding section on the opposite sides in the axial direction so as to limit displacement in the axial direction of the clutch retainer and to prevent the axially opposite end surfaces of the clutch retainer from coming in contact with members rotating relative to the clutch retainer, wherein at least one of the retaining sections is elastically deformed such that the clutch retainer is fitted onto the inner-diameter-side member or fitted into the outer-diameter-side member, and wherein the clutch retainer is made of a synthetic resin material with reinforcement fibers mixed therein such that the percentage of the mixed-in reinforcement fibers is 25% or less.

2. The rotation transmission apparatus with built-in one-way clutch of claim 1, wherein the one peripheral surface is the outer peripheral surface of the inner-diameter-side member, and the outer ring for the clutch is fitted inside the axially middle section of the outer-diameter-side member and has a pair of ring sections in the axially opposite ends that extend inward in the radial direction such that the inside surfaces of the ring sections that face each other come very close to and face the axially opposite end surfaces of the clutch retainer, respectively.

* * * * *